(12) United States Patent
Loustanau et al.

(10) Patent No.: US 7,413,202 B2
(45) Date of Patent: Aug. 19, 2008

(54) STRUT FOR A VEHICLE

(75) Inventors: Jean-Gérard Loustanau, Fondettes (FR); Domenico Ducci, Marentino (IT); Marcus Caldana, Lidköping (SE)

(73) Assignees: Aktiebolaget SKF, Gothenburg (SE); Minganti International Ltd, Dublin (IE)

( * ) Notice: Subject to any disclaimer, the term of this patent is extended or adjusted under 35 U.S.C. 154(b) by 475 days.

(21) Appl. No.: 11/126,884

(22) Filed: May 11, 2005

(65) Prior Publication Data

US 2006/0061056 A1    Mar. 23, 2006

(51) Int. Cl.
    *B60G 3/00*    (2006.01)
(52) U.S. Cl. .................. 280/124.125; 280/124.147; 280/93.512
(58) Field of Classification Search ............ 280/93.512, 280/124.147, 124.125
    See application file for complete search history.

(56) References Cited

U.S. PATENT DOCUMENTS

| | | | | |
|---|---|---|---|---|
| 1,398,615 A | * | 11/1921 | Williams | ............... 301/64.302 |
| 5,048,859 A | * | 9/1991 | Nishikuma et al. | .......... 180/253 |
| 6,450,585 B1 | * | 9/2002 | Kochsiek | ................. 301/124.1 |
| 6,497,515 B1 | * | 12/2002 | Sahashi et al. | .............. 384/544 |
| 6,808,190 B2 | * | 10/2004 | Fornbacher et al. | .... 280/93.512 |
| 7,195,399 B2 | * | 3/2007 | Myers et al. | ................ 384/544 |
| 2003/0108384 A1 | * | 6/2003 | Huang et al. | ................ 403/383 |
| 2003/0218309 A1 | * | 11/2003 | Wang | .................... 280/93.512 |

FOREIGN PATENT DOCUMENTS

DE    692 09 428 T3    9/1996

\* cited by examiner

*Primary Examiner*—Christopher Ellis
*Assistant Examiner*—Jacob Meyer
(74) *Attorney, Agent, or Firm*—Merchant & Gould P.C.

(57) ABSTRACT

Strut for a vehicle which is interposed between a suspension and a semi-axis of the vehicle, and which is provided with a central body, and a passing housing which is obtained through the central body along a longitudinal axis (A) in order to house a rolling contact bearing which is interposed between the strut itself and the semi-axis; a coupling device being foreseen between the rolling contact bearing and the passing housing, and being defined by two connecting outlines which are obtained around the rolling contact bearing and, respectively, inside the passing housing with a shape which is complementary in relation to each other, and presenting a radius (R) of angularly variable dimensions with continuity on a plane which is transverse to the longitudinal axis (A), and at least one respective convex portion in relation to the longitudinal axis (A).

6 Claims, 1 Drawing Sheet

STRUT FOR A VEHICLE

The present invention relates to a strut for a vehicle.

In general, in the field of vehicles, struts are interposed between a suspension and a semi-axis, and comprise a central body, an arm for being connected to the suspension, and a passing housing which is of a cylindrical shape and which is obtained through the central body in order to house a rolling contact bearing which is interposed between the strut itself and the semi-axis.

The struts which have just been described above have demonstrated some disadvantages in terms of the exact time when they are able to block the rolling contact bearing both in the direction of rotation which relates to the passing housing, as well as in the direction of axial translation of the passing housing itself.

The aim of the present invention is to produce a strut for a vehicle, which will permit a simple and cost-effective resolution of the above-described disadvantages.

According to the present invention, a strut for a vehicle will be produced, for a vehicle which is interposed between a suspension and a semi-axis of the vehicle, and comprising a central body, a connecting arm for connection to the suspension, and a passing housing which is obtained along a longitudinal axis through the central body in order to house a rolling contact bearing which is interposed between the strut itself and the semi-axis; the strut being characterised by the fact that it comprises a coupling device between the bearing and the passing housing which in its turn comprises a first connecting outline which is obtained around the contact rolling bearing, and a second connecting outline which is obtained inside the passing housing and which is of a shape which complements the first outline; the first and second connecting outlines presenting a radius of angularly variable dimensions with continuity on a plane which is transverse to the longitudinal axis, and which both comprise at least one respective convex portion in relation to the longitudinal axis itself.

Figure 1:
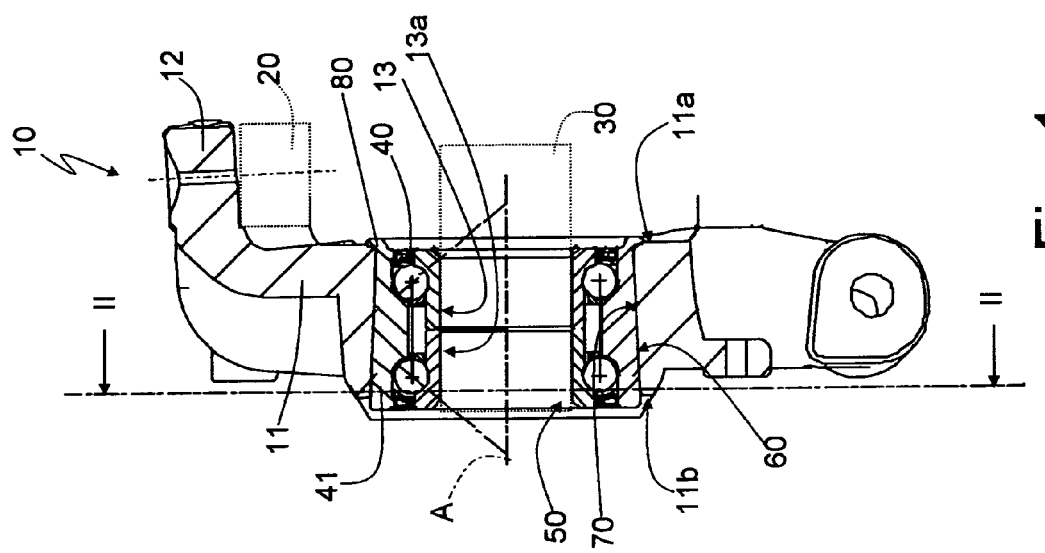
Figure 2:
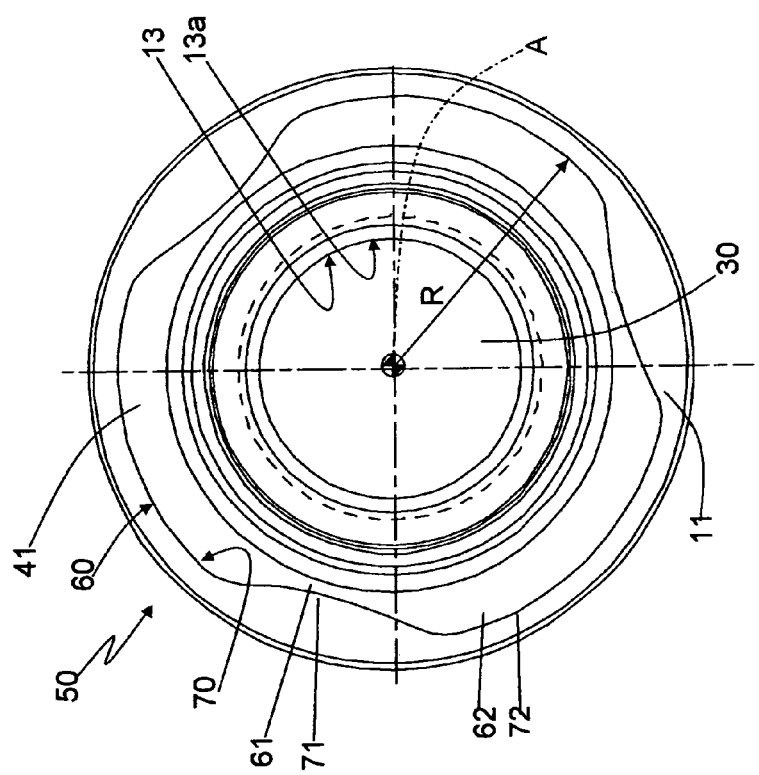

The present invention will now be described with reference to the attached drawings, which involve a non-limiting form of embodiment of the present invention, and in which:

FIG. 1 is a section view of a preferred form of embodiment of a strut according to the present invention; and FIG. 2 is a section according to the line II-II which is shown in FIG. 1.

With reference to FIG. 1, the number 1 refers to a strut for a vehicle in its entirety.

The strut 10 is suitable for being interposed between a suspension, which is schematically designed and which is indicated with the number 20, and a semi-axis, which is schematically designed and which is indicated with the number 30.

The strut 10 comprises a central body 11, a connection arm 12 which is used for connecting to the suspension 20, and a passing housing 13 which is obtained through the central body 11 along a longitudinal axis in order to house a rolling contact bearing 40 which is interposed between the strut 20 and the semi-axis 30.

The arm 12 extends in a direction which is substantially transverse to the central body 11 starting from the lateral surface 11a of the central body 11 itself, while the passing house 13 is axially delimited, from one side, by the surface 11a itself and, from the other side, by a surface 11b which is substantially parallel to the surface 11 and which is transverse to the axis A.

Finally, the strut 10 comprises a coupling device 50, which is interposed between the bearing 40 and the passing housing 13 in order to render angularly and axially integral with each other the bearing 40 and the passing housing 13 themselves, and which finally comprises a device 5, or even better, an outer race 41 of the rolling contact bearing 40 and a surface 13a which is inside the passing housing 13 itself.

The device 50 comprises a peripheral connecting outline 60 which is obtained around the outer race 41, and a complementary connecting outline 70, which is obtained on the surface 13a inside the passing housing 13, and which presents a shape which is complementary to the peripheral outline 60.

As is better illustrated in FIG. 2, the peripheral outline 60 and the complementary outline 70 both present a radius R of angularly variable dimensions with continuity on a plane which is transverse to the axis A, and which both comprise a number N1 of convex portions 61 e 71 in relation to the axis A itself, and a number N2 of concave portions 62 e 72 which are still in relation to the axis A. The values of the numbers N1 and N2 depend on the necessary constructive and planning characteristics, and may be equal to each other, as in cases of the kind, or different from each other.

In FIG. 2, a case is illustrated in which both the number N1 and the number N2 have a value which is equal to three, and the portions 61, 71 and 62, 72 are alternated around the axis A in relation to each other. As an alternative, and in a manner which may be easily understood as a result of the foregoing description, the peripheral outline 60 and the complementary outline 70 may both be provided with only one of the relative convex portions 61, 71, which may be arranged between the two relative concave portions 62, 72 contiguous in relation to each other.

In addition, the peripheral outline 60 and the complementary outline 70 present a truncated conical form which tapers towards the surface 11a, or rather which tapers in the direction of introduction for the mounting of the bearing 40 inside the passing housing 13, and, in virtue of this shape, permits a uni-directional axial blocking of the bearing 40 inside the central body 11.

Finally, the device 50 comprises a border 80, which defines a free end portion of the outer race 41, and which is turned up and rolled in such a way as to abut the surface 11a in order to axially block in definitive fashion the bearing 40 inside the passing housing 13.

It is obvious, from the foregoing description, that the presence of the device 50 does not only permit the said assembly of the rolling contact bearing 40 in relation to the strut 10, but also permits, in an extremely simple fashion, the blocking of the bearing 40 both radially, due to the presence of the peripheral outline 60 and the complementary outline 70, as well as axially due to the conical truncated form of the peripheral outline 60 and the complementary outline 70, as well as due to the presence of the border 80.

It is intended that the present invention should not be limited to the form of embodiment which is herein described and illustrated, which is to be considered as a first preferred form of embodiment of a strut for a vehicle, and which may instead be subject to further modifications in terms of the shape and dispositions of its parts, as well as to details pertaining to construction and assembly.

The invention claimed is:

1. Strut for a vehicle which is interposed between a suspension and a semi-axis of the vehicle, and comprising a central body, a connecting arm for connection to the suspension, and a passing housing extending along a longitudinal axis through the central body housing a rolling contact bearing interposed between the strut and the semi-axis; the strut comprising a coupling device between the bearing and the passing housing, which comprises a first connecting outline positioned around the contact rolling bearing, and a second connecting outline inside the passing housing and having a complementary shape to the first connecting outline; the first and second connecting outlines having a radius of angularly variable dimensions with continuity on a plane which is transverse to the longitudinal axis, and wherein both outlines comprise at least one respective convex portion in relation to the longitudinal axis.

2. Strut according to claim 1, wherein the first and second connecting outlines both comprise, in relation to the longitudinal axis, a first determined number of radial convex portions and a second determined number of radial concave portions.

3. Strut according to claim 2, wherein the first determined number of convex portions and the second determined number of concave portions coincide in relation to each other; the convex portions being radially alternated around the longitudinal axis in relation to the concave portions.

4. Strut according to claim 2, wherein the first and second connecting outlines comprise a truncated cone shape in relation to the longitudinal axis.

5. Strut according to claim 4, further comprising an axial blocker abutting the rolling contact bearing and with the first and second connecting outlines of the truncated cone shape, axially blocks the rolling contact bearing inside the passing housing.

6. Strut according to claim 5, wherein said axial blocker is defined by a border which is turned up and which is formed on an outer race of the rolling contact bearing.

* * * * *